(12) United States Patent
Nielsen

(10) Patent No.: US 6,944,278 B1
(45) Date of Patent: Sep. 13, 2005

(54) INTERNET-ACTIVATED CALLBACK SERVICE

(75) Inventor: Jakob Nielsen, Atherton, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 838 days.

(21) Appl. No.: 08/978,874

(22) Filed: Nov. 26, 1997

(51) Int. Cl.[7] ............................ H04M 3/42; H04L 12/66
(52) U.S. Cl. ................................. 379/210.01; 370/352
(58) Field of Search ............................ 379/88.11, 209, 379/93.24, 90.01, 202.01, 265.02, 204.01, 379/205.01, 210.02; 370/352, 356

(56) References Cited

U.S. PATENT DOCUMENTS

| | | | | |
|---|---|---|---|---|
| 4,313,036 A | * | 1/1982 | Jabara et al. | 379/230 |
| 5,027,387 A | * | 6/1991 | Moll | 379/115.02 |
| 5,311,574 A | * | 5/1994 | Livanos | 379/88.2 |
| 5,619,555 A | * | 4/1997 | Fenton et al. | 379/88.11 |
| 5,661,790 A | * | 8/1997 | Hsu | 379/209 |
| 5,742,674 A | * | 4/1998 | Jain et al. | 379/209 |
| 5,835,568 A | * | 11/1998 | Bass et al. | 379/209 |
| 5,883,964 A | * | 3/1999 | Alleman | 379/205.01 |
| 5,884,032 A | * | 3/1999 | Bateman et al. | 379/209 |
| 6,377,576 B1 | * | 4/2002 | Zwick et al. | 370/389 |

OTHER PUBLICATIONS

The International CallBack Book (Feb. 1995) by Gene Retske, pp. 5-9, 44 and 62.*

* cited by examiner

Primary Examiner—Benny Tieu
(74) Attorney, Agent, or Firm—Finnegan, Henderson, Farabow, Garrett & Dunner, L.L.P.

(57) ABSTRACT

Techniques for using the Internet to establish an international telephone call using a callback service where there is a rate difference between the source and destination countries are disclosed. In one approach the customer sends the call information to the callback service by connecting to their website and by completing an Internet based form. Alternatively call information can be provided in an e-mail. The callback service database places the call soon after the call information is received.

6 Claims, 8 Drawing Sheets

INTERNET-ACTIVATED CALLBACK SERVICE

BACKGROUND OF THE INVENTION

1. Field of the Invention

The invention relates to computer and communication systems and, more particularly, to callback services arranged over a data network, such as the Internet.

2. Description of Related Art

The cost of an international telephone call between two countries can differ based on where the call originates. Callback services take advantage of this price difference by allowing a customer to place an international telephone call by arranging to have it originate in the destination country. For example, a telephone call originating in Argentina and calling a phone number in the United States will typically cost more than the same telephone connection originating in the United States. Therefore, an Argentine customer may use a callback service that allows the call from Argentina to originate in the United States. The Argentine customer will place a call to a callback system's phone number in the United States. The customer hangs up the phone on the first ring, thus incurring no charge. The callback system places a call to the customers number and provides the customer with a dial tone, which connects the customer to a United States long distance carrier.

The Problems

Currently, callback services experience at least three problems. The first problem is that the public telephone company in the customer's country may try to block access to the callback service. Some countries have attempted to block access to certain phone numbers associated with callback services. In some areas this approach has even extended to the blocking of entire area codes and local office prefixes. Another approach attempts to block the touch-tone signals required for the callback service.

A second problem is that the user interface provided by the callback service is not user friendly. A typical callback service typically requires the user to enter a long stream of digits into the phone keypad.

The third problem is that in some countries the customer may be charged for the initial call to the callback service.

SUMMARY OF THE INVENTION

The invention provides methods, apparatus, systems, and computer program products which allow a user to activate a callback service by sending data over a network such as the Internet. The user provides callback information, such as the phone number of the party or parties involved, via a Web page or E-mail and may set or override a default delay before the call will be placed. The callback service's computer validates the customer's data and attempts to place the call. If the call is placed and the connection is made then the user is billed for the call using standard billing mechanisms. If the connection cannot be made, then the server will attempt to place the call again after one or more specified periods of time (e.g. retry on busy). If the attempt to place the call is still unsuccessful the server will send an E-mail message explaining the problem.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
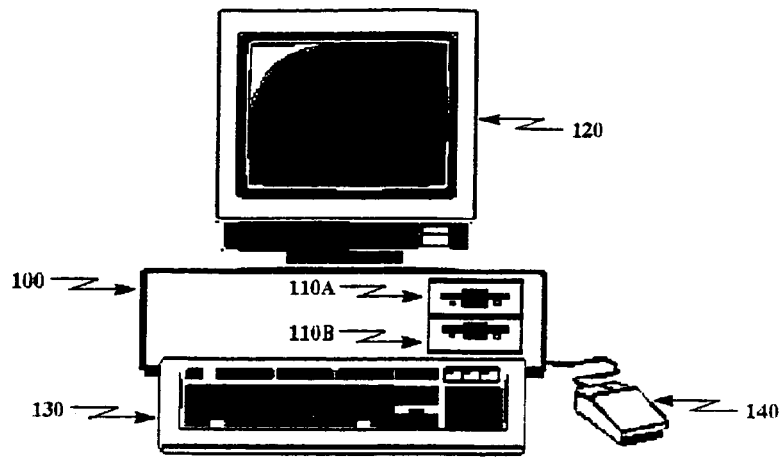
FIG. 1A is a view of an exemplary computer system suitable for use in carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
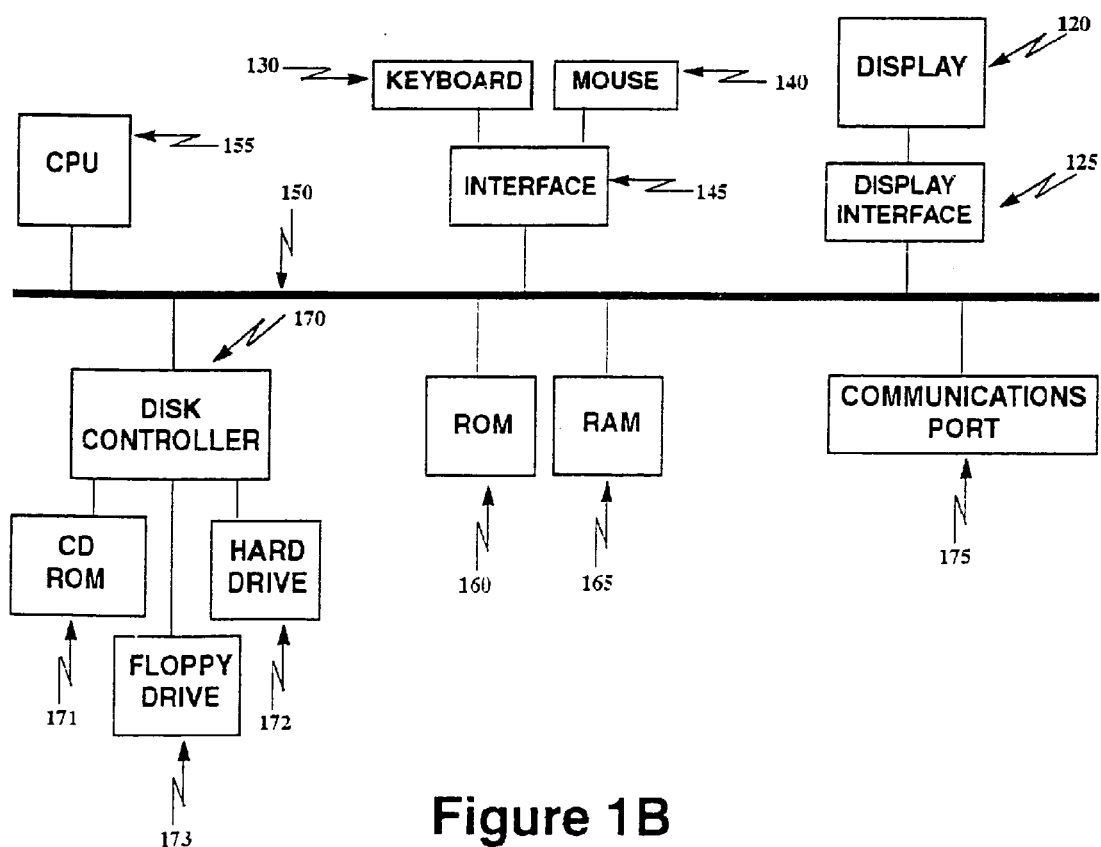
FIG. 1B is a block diagram of an exemplary hardware configuration of the computer of FIG. 1.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
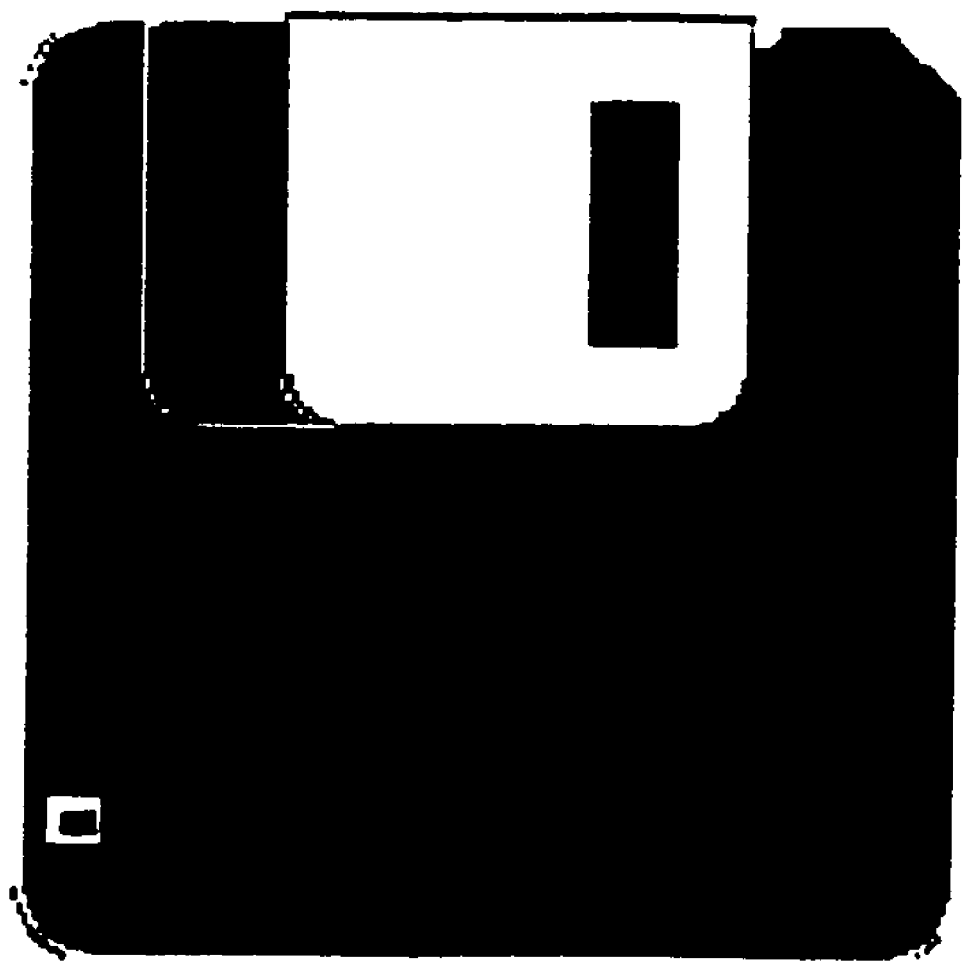
FIG. 1C is an illustration of an exemplary memory medium suitable for storing program and data information in accordance with the invention.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention.

Figure 1D:
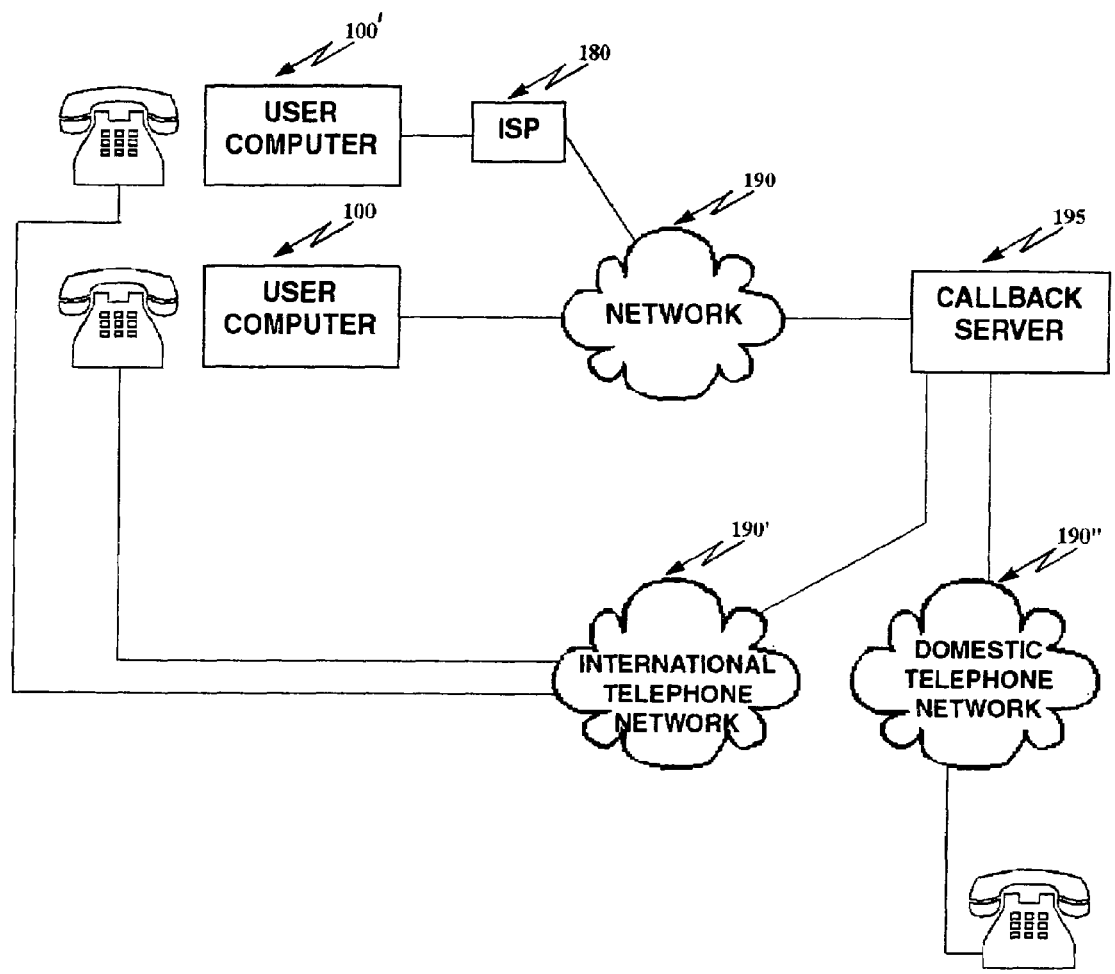
FIG. 1D is a block diagram of a network architecture suitable for carrying data and programs in accordance with some aspects of the invention.

FIG. 1D is a block diagram of a network architecture suitable for carrying data and programs in accordance with some aspects of this invention. A network 190 serves to connect a user computer 100 with one or more servers, such as a callback server 195 for the transfer of program and data information. A user can also connect to the network via a network service provider, such as an ISP 180. Users are also connected to international or domestic telephone networks, 190' and/or 190". In practice, the networks 190, 190' and 190" may be a single integrated voice and data network.

Figure 2:
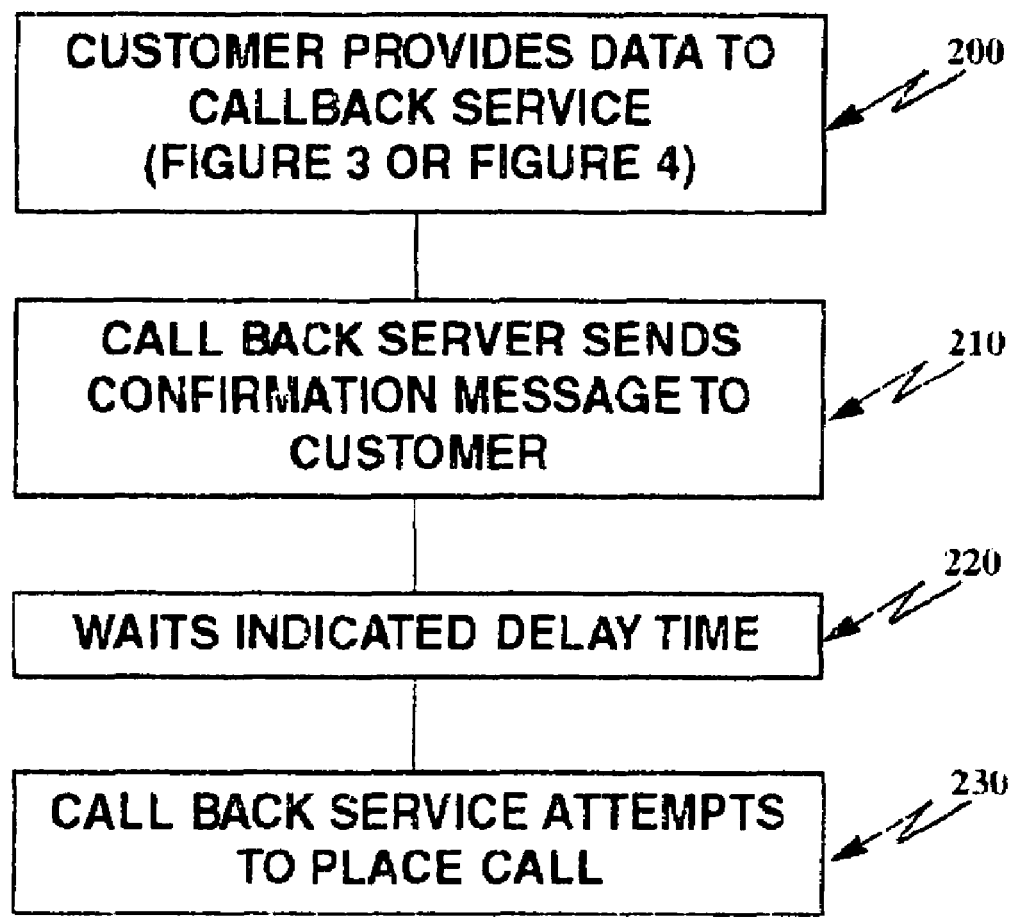
FIG. 2 is a flow chart of an exemplary Internet activated callback process in accordance with one embodiment of the invention.

FIG. 2 is a flow chart of an exemplary Internet activated callback process in accordance with one embodiment of the invention. A customer activates the callback service by providing certain information to the callback service (200). The information provided should include, but is not limited to: customer's phone number, customer's billing information (i.e., credit card number), and the acceptable delay before the call is placed.

The preferred embodiment for presenting callback information to the callback service is via an Internet based form. An exemplary process for handling Internet based forms is described in conjunction with FIG. 3. For those customers who do not have full Internet access an E-mail embodiment may be used to send data to the callback service as described in FIG. 4.

When the callback service receives the customer data it sends the customer a confirmation message 210. The confirmation will indicate the time the call will be placed (e.g., 30 seconds or 1 minute from the time the message was sent if a World Wide Web form was used). The message will be sent using the same mode as the customer used to transmit data to the callback server. For example, if the customer used E-mail to send data then the response from the callback service will be via E-mail. The callback service waits for a period of time indicated by the customer 220. This delay will allow the customer time to disconnect the modem line so that the same telephone line may be used for the phone call if desired. If the user connects to the Internet using UUCP, the delays prior to the callback will necessarily be longer. When the appropriate delay has elapsed the callback service attempts to place the phone call 230.

Figure 3:
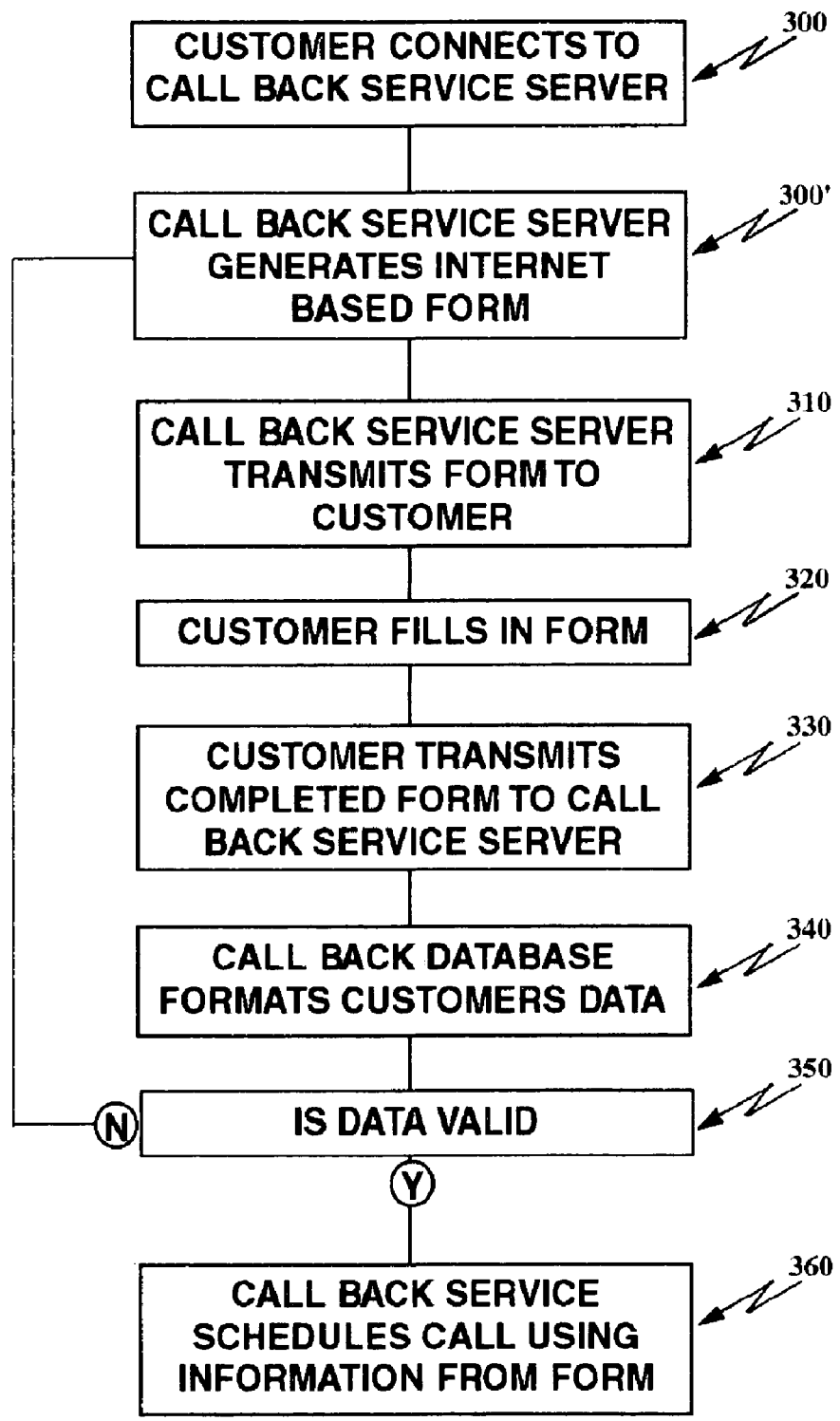
FIG. 3 is a flow chart of an exemplary process for generating and receiving information using a World Wide Web Internet based form in accordance with one embodiment of the invention.

FIG. 3 is a flow chart of an exemplary process for generating and receiving callback information using a World Wide Web based form. When a customer connects to a call back service server (300), such a form can be generated using standard HTML or by a Java servelet 300. The form is then transmitted to the user by using standard Internet protocols 310. The user fills in the data required 320 and transmits the completed form back to the server 330. The server will reformat applicable data elements to conform with the callback service standards 340. For example, different countries handle dates in different formats. Therefore, before a date is processed, it is preferably converted into a standard format. The form data is then validated to ensure that all required data has been provided 350. Validation is required in order to ensure the customer has entered data in all required fields, (i.e., phone number to call, date and time of call, and billing information) and to ensure that the data is within acceptable ranges. For example, the time to place the call needs to be validated to ensure that it has not already passed. This validation can take place on the server side using a CGI or Java program or on the client side using a Java applet. If the data cannot be validated then the server will generate a new form describing the problem and asking the customer to respond 300. Once the data has been formatted, the call is scheduled and the confirmation message 210 is sent.

Figure 4:
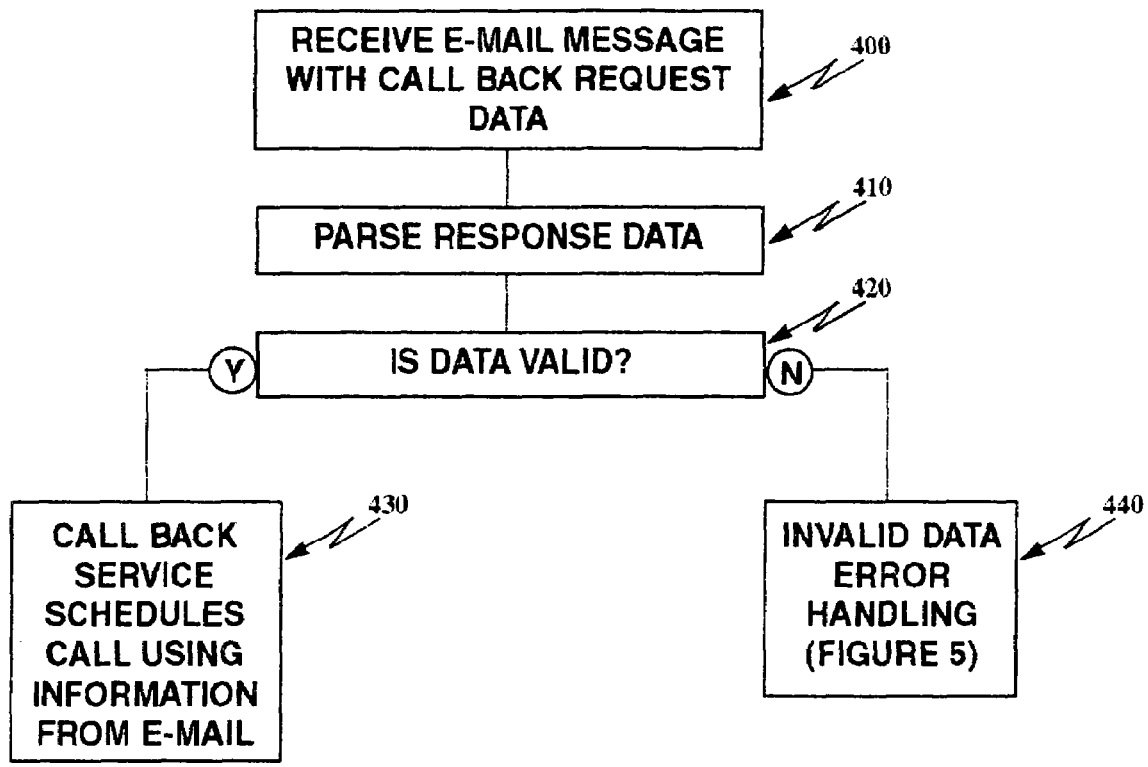
FIG. 4 is a flow chart of an exemplary process for handling an e-mail callback request in accordance with one embodiment of the invention.

FIG. 4 is a flow chart of an exemplary process for handling an e-mail callback request. When such a message is received, it is received in a pre-defined format. For example, the word "callback" may be placed in the header and additional information in the body of the e-mail, such as the telephone number of the party requesting the callback, the number to be called and the credit card information needed for billing. The data in the e-mail is passed into its constituent elements (410) and validated (420). If the data is valid, the call is scheduled. If not, an error message is generated. Exemplary error handling resulting in an error message is shown in FIG. 5.

Figure 5:
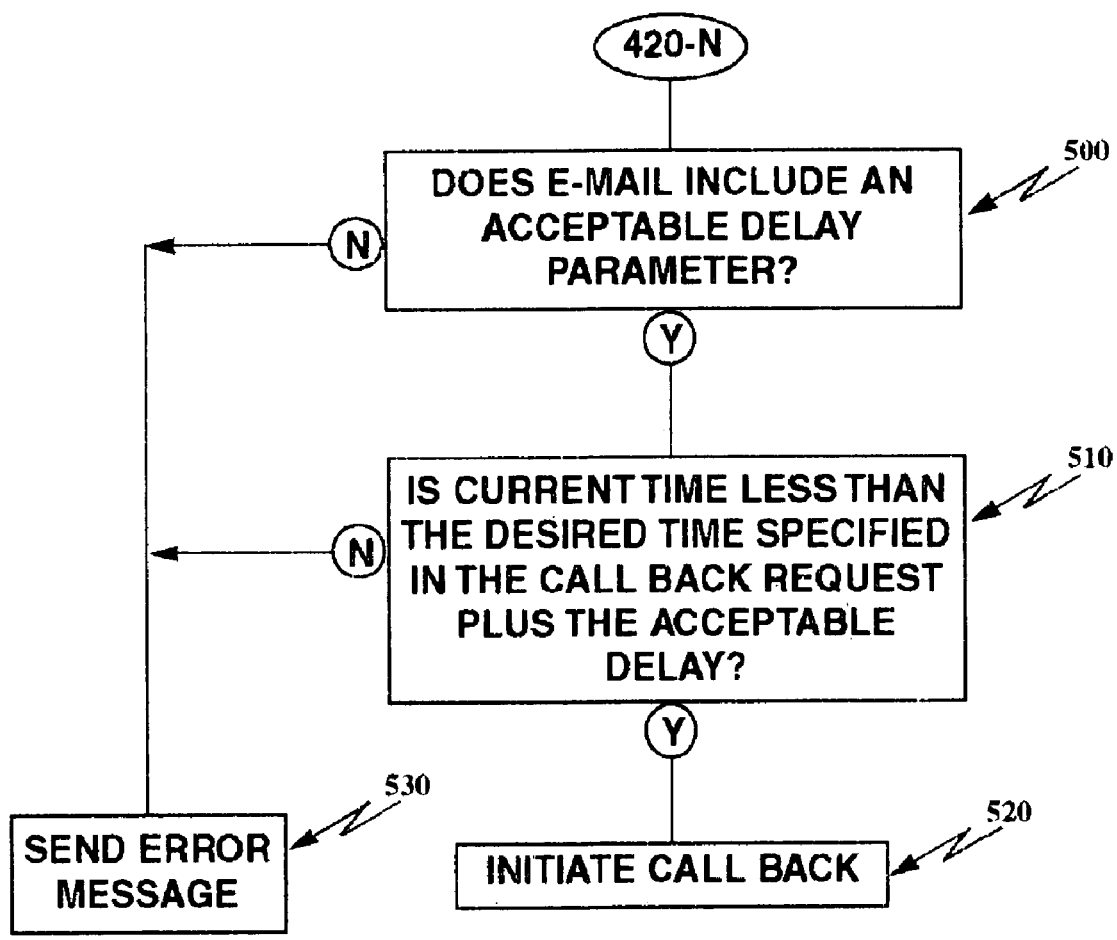
FIG. 5 is a flow chart of an exemplary process for handling invalid data.

FIG. 5 is an exemplary process for handling invalid data. When the data is determined to be invalid, for example, when the time for the requested call has passed, a check will be made to determine whether or not the e-mail includes an acceptable delay parameter (500). If it does, 500-Y, a check is made to determine if the current time is less than the sum of the desired time specified in the callback request plus the acceptable delay value (510). If it is (510-Y), the callback will be initiated (520). Otherwise, (500-N and 510-N), an error message will be generated indicating the reasons why the callback could not be completed. In countries where the Internet connection and/or e-mail is operated by the same telephone company which operates overpriced international long distance service, there is a risk that the company may try to intercept e-mail messages or Web access to callback services. To avoid this problem, the callback service can optionally establish a variety of servers with different domain names and provide access from these secondary servers to its primary server. It will also be possible to use coded language in the e-mail messages to foil any message sniffers. For example, an e-mail message with the body text "Mary had a little lamb" could mean "call my Mother Saturday morning at 10 am ". If this optional extension is used, then the callback service will need to establish a database entry that for each customer stores a list of individual codes and their associated meaning.

Figure 6:
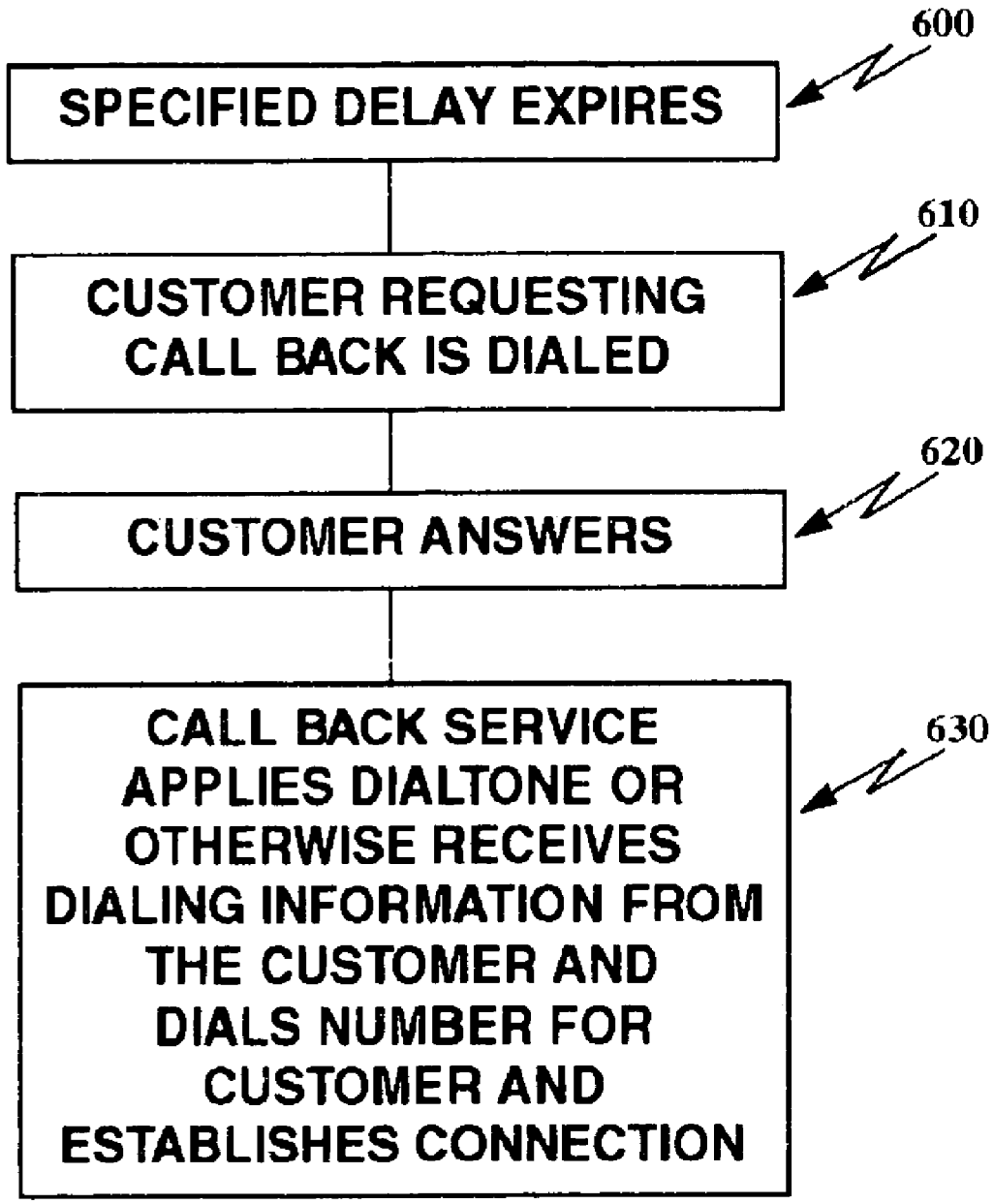
FIG. 6 is a flow chart of an exemplary process for providing the callback service requested.

FIG. 6 is a flow chart of an exemplary process for providing the callback service requested. When the specified delay expires (600) the customer requesting the callback is dialed by the callback service (610). When the customer answers (620), the callback service either applies dial tone or otherwise receives dialing information from the customer and dials the number for the customer and establishes the connection (630). It may be that the number of the party to which the customer desires to be connected is predefined in the World Wide Web form or in the e-mail message utilized to obtain the callback service. If it is, the number can be dialed automatically as soon as the customer who requested the callback answers. In traditional callback services, a dial tone of some sort is provided and the callback service customer dials in the number of the party to which he or she desires to be connected. However, the inclusion of the number of the party to which the callback service customer desires to be connected in the Internet communication is preferable because it circumvents the prohibition on touchtones or other dialing type of indicia being sent across the PTT lines of the particular country in which the callback service customer resides.

One should note that the particular delay period specified or selected by the callback service customer when sending the information over the Internet may be dictated by the type of connection service that the user has access to. For example, if a UUCP connection is utilized, e-mail messages may have a significant delay in being delivered. When using the World Wide Web, however, connection to a server permits substantially on-line interaction to occur in substantially real time. As described, the capability and functionalities of callback services are enhanced and the availability of the services to users in foreign countries increased by permitting callback service requests to be submitted over a data network such as the Internet.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. A callback service, comprising:
   a telephone network;
   a plurality of users, each having access to said telephone network;
   a data network;
   at least one user having access to said data network; and
   a computer having access to said telephone network and said data network and configured to originate a call to at least one user over said telephone network in response to information received over said data network and to provide a dial tone to said at least one user, wherein the call is delayed a predetermined amount of time after the information is received over the data network, the predetermined amount of time being determined using an estimate of the amount of time a message takes to go across the data network from a user to said callback service and sufficient for the at least one user to disconnect from the data network.

2. The callback service of claim 1 in which a call originated by said computer is to a user in a country different from the country in which said computer is located.

3. The callback service of claim 1 in which said information received over said data network is received over the Internet.

4. The callback service of claim 1 in which said information received over said data network is received over the world wide web portion of the Internet.

5. The callback service of claim 1 in which said information received over said data network is received by e-mail over the Internet.

6. The callback service of claim 1 in which telephone connections of said telephone network and data of said data network are carried at least in part over an integrated voice-data network.

* * * * *